(12) United States Patent
Asano et al.

(10) Patent No.: US 8,936,012 B2
(45) Date of Patent: Jan. 20, 2015

(54) CYLINDER HEAD

(75) Inventors: Masahiko Asano, Toyota (JP); Toshiaki Hamaguri, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 801 days.

(21) Appl. No.: 13/147,138

(22) PCT Filed: Sep. 27, 2010

(86) PCT No.: PCT/JP2010/066648
§ 371 (c)(1),
(2), (4) Date: Jul. 29, 2011

(87) PCT Pub. No.: WO2012/042584
PCT Pub. Date: Apr. 5, 2012

(65) Prior Publication Data
US 2012/0085300 A1    Apr. 12, 2012

(51) Int. Cl.
*F02B 47/08* (2006.01)
*F02M 25/07* (2006.01)
*F16L 19/07* (2006.01)
(Continued)

(52) U.S. Cl.
CPC ........... *F02M 25/0735* (2013.01); *F16L 19/07* (2013.01); *F16L 25/14* (2013.01); *F02M 25/0703* (2013.01); *F02M 25/0737* (2013.01);
(Continued)

(58) Field of Classification Search
CPC ............. Y02T 10/121; F02M 25/0747; F02M 25/0735; F02M 35/10222; F02M 25/0723; F02M 25/0748; F02M 25/0722; F02M 25/07; F02M 25/0703; F02M 25/0724; F02M 25/0715

USPC ............... 60/278, 605.2; 123/568.11, 568.12, 123/568.13, 568.17
See application file for complete search history.

(56) References Cited

U.S. PATENT DOCUMENTS

2003/0230290 A1* 12/2003 Mackey et al. .......... 123/568.13
2004/0255918 A1* 12/2004 Mackey et al. .......... 123/568.12
(Continued)

FOREIGN PATENT DOCUMENTS

JP    S49-65823 U    9/1972
JP    S51-94321 U    1/1975
(Continued)

OTHER PUBLICATIONS

International Search Report dated 2226 Oct. 2010.

*Primary Examiner* — Mahmoud Gimie
*Assistant Examiner* — Sizo Vilakazi
(74) *Attorney, Agent, or Firm* — Kenyon & Kenyon LLP

(57) ABSTRACT

The first aspect of the present invention is a cylinder head containing a water jacket in which a passage for EGR gas is disposed, and the EGR gas passage has a hollow pipe that is disposed in the hollow pipe and through which the EGR gas passes and an end member that is formed with an insert hole into which the end of the hollow pipe is inserted and fixed. The end member has a bottom that is provided with the insert hole, a side wall that is formed continuously to the bottom, and a wedge portion that is projected outward from the outer peripheral of the side wall and includes a inclined surface facing the wall of the cylinder head and inclined to the flow direction of the EGR gas. The EGR gas passage is fixed to the cylinder head by holding the wedge portion of the end member between a fastening member for fastening the EGR gas passage to the cylinder head and the wall of the cylinder head.

6 Claims, 3 Drawing Sheets

(51) Int. Cl.
*F16L 25/14* (2006.01)
*F02F 1/36* (2006.01)

(52) U.S. Cl.
CPC ............ *F02M 25/0747* (2013.01); *Y02T 10/121* (2013.01); *F02F 1/36* (2013.01)
USPC ................................ 123/568.12; 123/568.17

(56) References Cited

U.S. PATENT DOCUMENTS

2008/0276887 A1* 11/2008 Sohn et al. ................. 123/41.79
2013/0055970 A1* 3/2013 Harada et al. .............. 123/41.79

FOREIGN PATENT DOCUMENTS

| | | |
|---|---|---|
| JP | S52-77324 U | 12/1975 |
| JP | S52-90609 U | 12/1975 |
| JP | S56-22458 U | 7/1979 |
| JP | S56-65153 U | 10/1979 |
| JP | S57-31560 U | 7/1980 |
| JP | S59-49755 U | 4/1984 |
| JP | S59-107391 U | 7/1984 |
| JP | S62-162489 U | 10/1987 |
| JP | S62-247166 A | 10/1987 |
| JP | S63-73561 U | 5/1988 |
| JP | S63-89491 U | 6/1988 |
| JP | S63-143754 U | 9/1988 |
| JP | S64-44344 U | 3/1989 |
| JP | H1-111165 U | 7/1989 |
| JP | H04-121453 U | 10/1992 |
| JP | 05-103917 A | 4/1993 |
| JP | H06-101578 A | 4/1994 |
| JP | H06-108928 A | 4/1994 |
| JP | H6-76644 U | 10/1994 |
| JP | H07-247917 A | 9/1995 |
| JP | 08-049606 A | 2/1996 |
| JP | 09-053774 A | 2/1997 |
| JP | H10-122036 A | 5/1998 |
| JP | H11-082185 A | 3/1999 |
| JP | H11-210576 A | 8/1999 |
| JP | 2000-161131 A | 6/2000 |
| JP | 2001-227414 A | 8/2001 |
| JP | 2002-004953 A | 1/2002 |
| JP | 2002-004955 A | 1/2002 |
| JP | 2002-122044 A | 4/2002 |
| JP | 2002-180912 A | 6/2002 |
| JP | 2002-235607 A | 8/2002 |
| JP | 2002-339797 A | 11/2002 |
| JP | 2002-339809 A | 11/2002 |
| JP | 2004-108256 A | 4/2004 |
| JP | 2004-138023 A | 5/2004 |
| JP | 2004-347252 A | 12/2004 |
| JP | 2005-069060 A | 3/2005 |
| JP | 2005-090361 A | 4/2005 |
| JP | 2005-226585 A | 8/2005 |
| JP | 2005-307960 A | 11/2005 |
| JP | 2006-084017 A | 3/2006 |
| JP | 2006-307759 A | 11/2006 |
| JP | 2007-224784 A | 9/2007 |
| JP | 2007-270721 A | 10/2007 |
| JP | 2007-303436 A | 11/2007 |
| JP | 2007-309168 A | 11/2007 |
| JP | 2008-045499 A | 2/2008 |
| JP | 2008-057359 A | 3/2008 |
| JP | 2008-057360 A | 3/2008 |
| JP | 2008-075522 A | 4/2008 |
| JP | 2008-082307 A | 4/2008 |
| JP | 2008-111373 A | 5/2008 |
| JP | 2008-285997 A | 11/2008 |
| WO | WO2007/050563 A1 | 5/2007 |

* cited by examiner

CYLINDER HEAD

This is a 371 national phase application of PCT/JP2010/066648 filed 27 Sep. 2010, the contents of which are incorporated herein by reference.

TECHNICAL FIELD

The present invention relates to a cylinder head, more specifically to a technique for fixing an EGR gas passage to a cylinder head, which contains the EGR gas passage in a water jacket thereof.

BACKGROUND ART

An Exhaust Gas Recirculation (EGR) device that recirculates a part of the exhaust gas to the intake air side is broadly used in the field of engine technology.

JP H8-49606 A discloses that the passage for the EGR gas recirculated by the EGR device is arranged in the water jacket of the cylinder head to cool the EGR gas.

JP H8-49606 A discloses that the EGR gas passage is arranged in the water jacket and the both ends of the passage are fixed to the through holes formed in the two facing walls of the water jacket of the cylinder head.

Unfortunately, the machining errors involved in the through holes may occur the misalignment between the axes of the holes. The misalignment remains the gap between the EGR gas passage and the through hole after fixing the EGR gas passage to the through holes, which occurs a problem with the fixing strength and sealing property.

CITATION LIST

Patent Literature

Patent Literature 1: JP H8-49606 A

SUMMARY OF INVENTION

Technical Problem

The objective of the present invention is to provide a technique to achieve the expected fixing strength and sealing property when the EGR gas passage disposed in the water jacket is fixed to the cylinder head.

Technical Solution

The first aspect of the present invention is a cylinder head containing a water jacket in which a passage for EGR gas is disposed, and the EGR gas passage has a hollow pipe that is disposed in the hollow pipe and through which the EGR gas passes and an end member that is formed with an insert hole into which the end of the hollow pipe is inserted and fixed. The end member has a bottom that is provided with the insert hole, a side wall that is formed continuously to the bottom, and a wedge portion that is projected outward from the outer peripheral of the side wall and includes a inclined surface facing the wall of the cylinder head and inclined to the flow direction of the EGR gas. The EGR gas passage is fixed to the cylinder head by holding the wedge portion of the end member between a fastening member for fastening the EGR gas passage to the cylinder head and the wall of the cylinder head.

In the advantageous embodiment of the present invention, the side wall includes an inclined portion inclined to the flow direction of the EGR gas.

More advantageously, the inclined portion of the side wall is formed by turning the side wall sharply from the outer side to the inner side of the side wall.

In the alternative preferable embodiment of the present invention, the inclined portion of the side wall is inclined such that the outer diameter thereof becomes gradually large from the inner side to the outer side of the cylinder head.

In one embodiment of the present invention, the hollow pipe preferably includes an inclined portion inclined to the flow direction of the EGR gas.

Advantageous Effects of Invention

According to the embodiment of the present invention, the expected fixing strength and sealing property are achieved when fixing the EGR gas passage to the cylinder head.

DESCRIPTION OF EMBODIMENTS

The attached drawings show the structure of a cylinder head 1 as one embodiment of a cylinder head according to the present invention.

Figure 1:
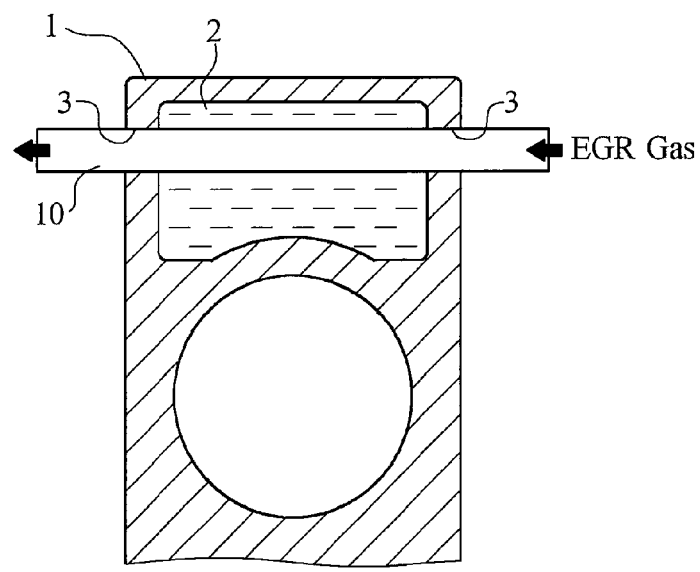
FIG. 1 depicts a cylinder head.

As shown in FIG. 1, the cylinder head 1 contains a water jacket 2 through which cooling water passes. The cylinder head 1 includes an EGR gas passage 10 through which EGR gas passes and which is disposed in the water jacket 2.

The EGR gas passage 10 straightly passes through the cylinder head 1 and the both ends thereof are fixed to fastening holes 3 formed at the walls of the cylinder head 1. Two fastening holes 3 are drilled coaxially through the two facing walls of the cylinder head 1.

Figure 2:
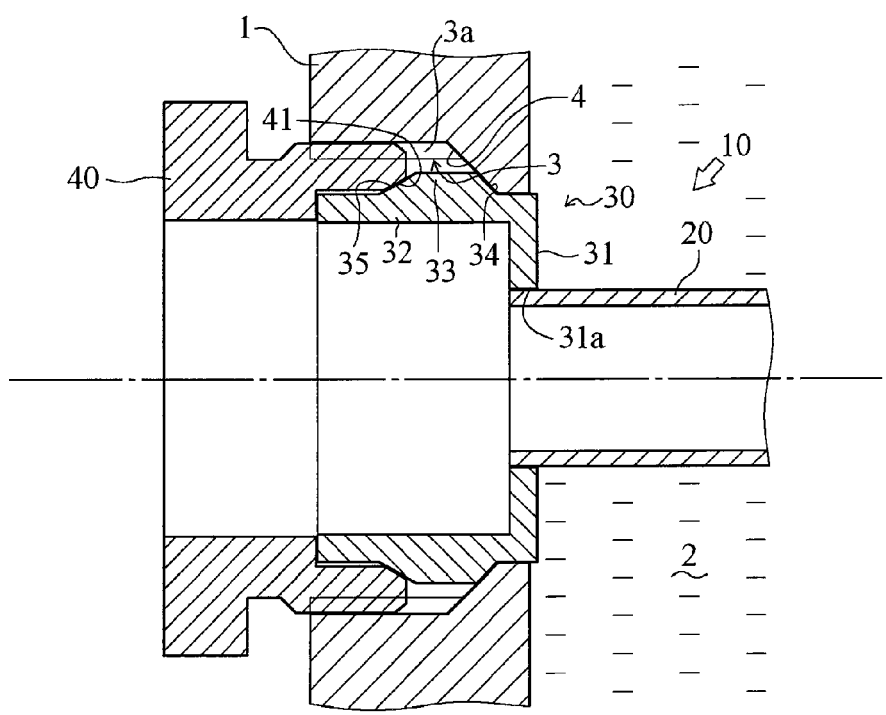
FIG. 2 depicts an EGR gas passage.

FIG. 2 shows the structure of the EGR gas passage 10.

As shown in FIG. 2, the EGR gas passage 10 includes a pipe 20 and two cylindrical cups 30, and the passage is fixed to the cylinder head 1 by using two gas threads 40.

The pipe 20 is a thin hollow pipe and the EGR gas passes therethrough. The pipe 20 is disposed in the water jacket 2 and across the cylinder head 1. That is, the cooling water passing through the water jacket 2 cools the EGR gas passing through the pipe 20.

The cylindrical cups 30 are the end members of the EGR gas passage 10 and attached to the ends of the pipe 20. For instance, the cups 30 are welded to the pipe 20. The cup 30 has a cylindrical shape having a bottom. The cup 30 has the outer periphery in accordance with the shape of the fastening hole 3 of the cylinder head 1, and thereby the cup 30 is fittable to the hole 3.

The cup 30 is arranged coaxially to the pipe 20. The inside of the cup 30 is communicated with the inside of the gas thread 40 at the outside of the cylinder head 1.

The gas thread 40 gives the fastening force to the cylindrical cup 30 fitted into the fastening hole 3 of the cylinder head 1 and fastens the cup 30 to the hole 3 of the cylinder head 1. In detail, the cup 30 attached to the end of the pipe 20 is fitted with the hole 3 and the gas thread 40 fastens the cup 30 to the hole 3, whereby the EGR gas passage 10 is fixed to the cylinder head 1.

The rotation axis of the thread 40 is arranged coaxially to those of the pipe 20 and the cup 30. The thread 40 is a parallel pipe thread having a male thread at the outer periphery thereof, and the male thread is threaded into the female thread 3a formed at the inner surface of the hole 3. The thread 40 is threaded into the female thread 3a to apply the fastening force (axial force) to the cup 30.

The gas thread 40 has a hollow shape and is communicated with the inside of the cup 30. Thus, the EGR gas passage 10 is communicated with the insides of the gas threads 40 at the upstream side and the downstream side, thereby arranged across the cylinder head 1.

As shown in FIG. 2, the cylindrical cup 30 has a bottom 31 and a side wall 32, and the side wall 32 has a wedge portion 33 projected outward from the outer peripheral thereof.

The bottom 31 is formed with an insert hole 31a which is connectable with the pipe 20, and the end of the pipe 20 is fitted into the insert hole 31a. The bottom 31 is configured as the wall perpendicular to the axis of the cup 30 and the insert hole 31a is disposed at the center thereof.

The side wall 32 defines the inside of the cup continued from the bottom 31. The side wall 32 is configured as the wall parallel to the axis of the cup 30 and as the wall continued from the outside of the bottom 31. The side wall 32 is formed from the one end to the other end of the cup 30.

The wedge portion 33 projects radially outward from the outside of the side wall 32, and the wedge portion is formed around the side wall 32. The wedge portion 33 has an inclined surface 34 at the inner side of the cylinder head 1, i.e., at the side of the bottom 31.

The inclined surface 34 is formed as the surface inclined to the axis of the cup 30 by the given angle, and the inclined surface is formed around the wedge portion 33. The inclined surface 34 is elongated from the inside to the outside of the cylinder head 1. The inclined angle (wedge angle) of the inclined surface 34 is determined so as to engage to an inclined surface 4 formed in the fastening hole 3 of the cylinder head 1.

The inclined surface 4 is formed in the fastening hole 3 at the inside of the cylinder head 1 and defines the part of the wall of the cylinder head 1. The diameter of the inclined surface 4 becomes gradually larger from the inside to the outside of the cylinder head 1. The area of the inclined surface 4 is set larger than the inclined surface 34 of the wedge portion 33. Thus, the inclined surface 4 has enough allowable range to the inclined surface 34, so that the cylindrical cup 30 is widely adjustable to the cylinder head 1 when mounting the cup to the cylinder head.

The inclined surface 4 accepts the pressure from the cylindrical cup 30 (i.e., from the inclined surface 34) to the cylinder head 1 when the cup 30 is fastened to the cylinder head 1, so that the inclined surface 4 performs as the sealing surface.

The wedge portion 33 has an inclined surface 35 formed at the outer side of the cylinder head 1. The inclined surface 35 is the surface inclined to the axis of the cylindrical cup 30 by the given angle and formed around the wedge portion 33. The inclined surface 35 is tapered from the inside to the outside of the cylinder head 1. The inclined surface 35 engages with an inclined portion 41, which is formed at the end of the gas thread 40.

The inner diameter of the inclined portion 41 becomes gradually smaller from the inside to the outside of the cylinder head 1, and is formed as the pressing surface toward the cylindrical cup 30 (i.e., toward the inclined surface 35) when fastening the cup 30 to the cylinder head 1.

Figure 3:
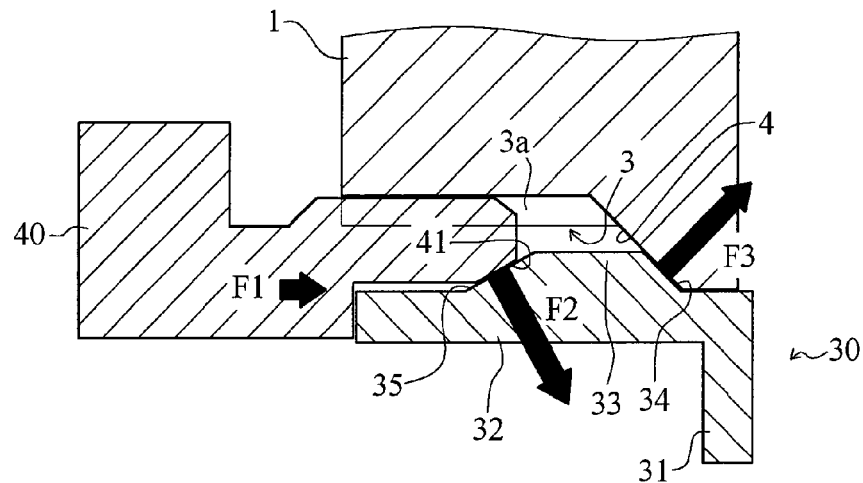
FIG. 3 shows the fastening force generated when the EGR gas passage is fixed to the cylinder head.

FIG. 3 shows the fastening embodiment of the EGR gas passage 10 to the cylinder head 1 by using the gas thread 40.

The thread 40 is threaded into the female thread 3a, thereby generating the axial force F1 in the axial direction of the thread 40. The axial force F1 is transferred as the fastening force F2 from the inclined portion 41 to the inclined surface 35, and then it is transferred as the fastening force F3 from the inclined surface 34 to the inclined surface 4. The gas thread 40 and the cylinder head 1 hold the wedge portion 33 of the cylindrical cup 30, so that the cup 30 is fixed to the fastening hole 3 of the cylinder head 1.

The fastening force F2 generated between the inclined portion 41 and the inclined surface 35 and the fastening force F3 generated between the inclined surface 34 and the inclined surface 4 are increased by the wedge effects, each of which is worked in response to the inclined angle to the axial force F1.

As described above, when fastening with the gas thread 40, the inclined surface 34 of the wedge portion 33 and the inclined surface 4 of the fastening hole 3 are pressed by the large force under the wedge effect, and therefore, there are good sealing and fixing strength between the cylindrical cup 30 and the cylinder head 1.

Moreover, the pressure acting between them flattens the rough surfaces of the cylinder head 1 and the cylindrical cup 30, so that the strong sealing property is provided. As between the gas thread 40 and the cylindrical cup 30, good sealing and fixing strength are provided by the wedge effect, and hence there exists a double sealing structure and the water jacket 2 is prevented from leakage of the cooling water.

In the above-described embodiment, the wedge portion 33 is the part of the cylindrical cup 30, but the wedge portion can be separated from the cup 30. The separation of the wedge portion 33 from the cup 30 makes the shape of the cup 30 simple and facilitates the machining of the cup 30 and the wedge portion 33.

In the above-described embodiment, the wedge portion 33 projects from the outside of the side wall 32, but the side wall 32 can be bent so as to configure the wedge portion 33. In other words, instead of the wedge portion 33 which partially forms the thick portion, the side wall is configured as the wall having the even thickness. In this case, the bent portion of the side wall has spring property, so that the fine adjustment is obtained among the gas thread 40, cylindrical cup 30 and the fastening hole 3.

In the above-described embodiment, the cylindrical cup 30 is configured as the cylinder shape with circular outside, however, the outer shape of the cup 30 may be ellipsoidal, triangular, quadrilateral or polygonal.

Figure 4:
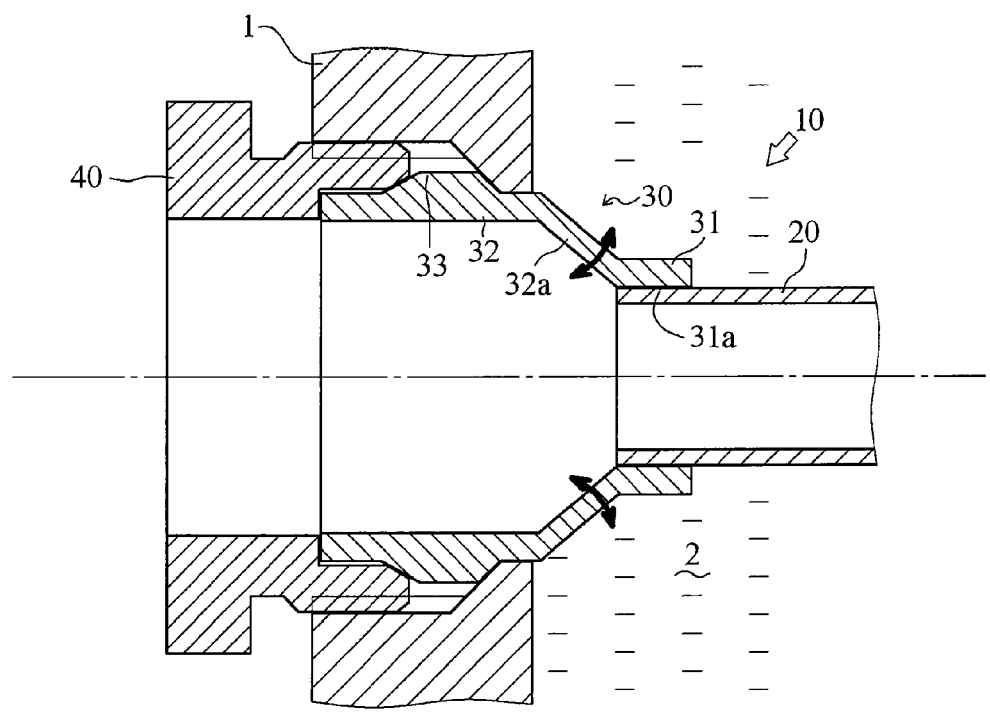
FIG. 4 illustrates the other embodiment of a cylindrical cup.

FIG. 4 depicts the alternative preferable embodiment of the cylindrical cup 30.

The cylindrical cup 30 shown in FIG. 4 has the inclined side wall 32 continued from the bottom 31. The side wall 32 includes an inclined portion 32a that is inclined to the flow direction of the EGR gas.

The inclined portion 32a is inclined to the axes of the pipe 20 and the cylindrical cup 30, and the inclined angle is not perpendicular to the axes. The inclined portion 32a is formed at the end of the side wall 32, in detail, the inner side of the cylinder head 1 and at the connecting portion of the side wall 32 to the bottom 31. The inclined portion 32a doesn't contact the inside of the fastening hole 3 and is extended inward from the inside of the cylinder head 1.

As described above, the side wall 32 is formed with the inclined portion 32a, and the side wall 32 has the spring property. More specifically, the part of the side wall 32 is inclined to the axes of the pipe 20 and the cylindrical cup 30, and the pipe 20 is floatingly supported, so that the pipe 20 is allowed to move in the perpendicular direction to the axial direction of the cylindrical cup 30.

The misalignment between the fastening holes 3 formed in the cylinder head 1 is allowed by the spring property of the inclined portion 32a. Therefore, the EGR gas passage 10 is fixed to the cylinder head 1 with accuracy, and the pipe 20 is prevented from damage when the EGR gas passage 10 is fixed to the cylinder head 1.

The condensed water generated by the EGR gas is discharged outside of the pipe 20 and the cup 30 along the inclination of the inclined portion 32a, and thereby prevented from the problem caused by the condensed water.

As shown in FIG. 4, the bottom 31 is formed along the axial direction of the pipe 20 so that the connecting length between the insert hole 31a and the pipe 20 become longer, thereby taking the enough length for the welding or the like.

The cylindrical cup 30 and the pipe 20 are jointed in the large area, so that the strong joint is obtained.

Figure 5:
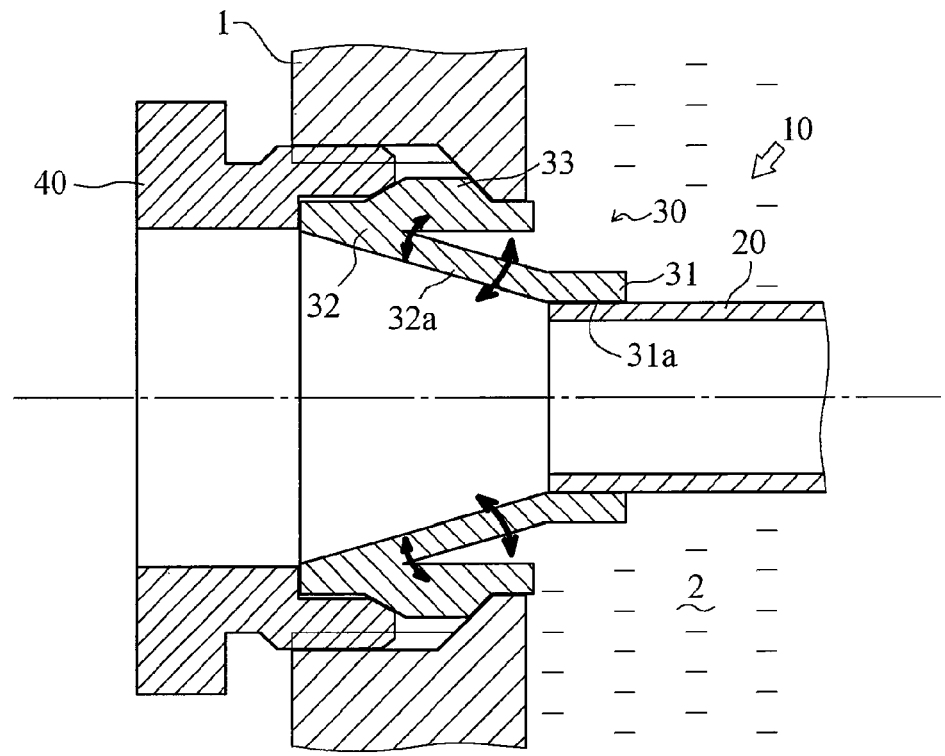
FIG. 5 illustrates the alternative embodiment of the cylindrical cup.

FIG. 5 depicts the other embodiment of the inclined portion 32a.

The inclined portion 32a as shown in FIG. 5 is extended from the base end of the side wall 32, that is the outer side of the cylinder head 1, to the bottom 31. In the cylindrical cup 30, the inclined portion 32a is extended inward radially from the base end of the side wall 32 to the bottom 31.

The cylindrical cup 30 includes the inclined portion 32a that is formed by inwardly bending the side wall 32 at the sharp angle from the base end of the side wall 32.

The inclined portion 32a obtains not only the spring property due to the inclination but also the spring property due to the bending, and therefore the spring property of the cup 30 is improved and the allowable range is enhanced for the misalignment of the fastening holes.

Figure 6:
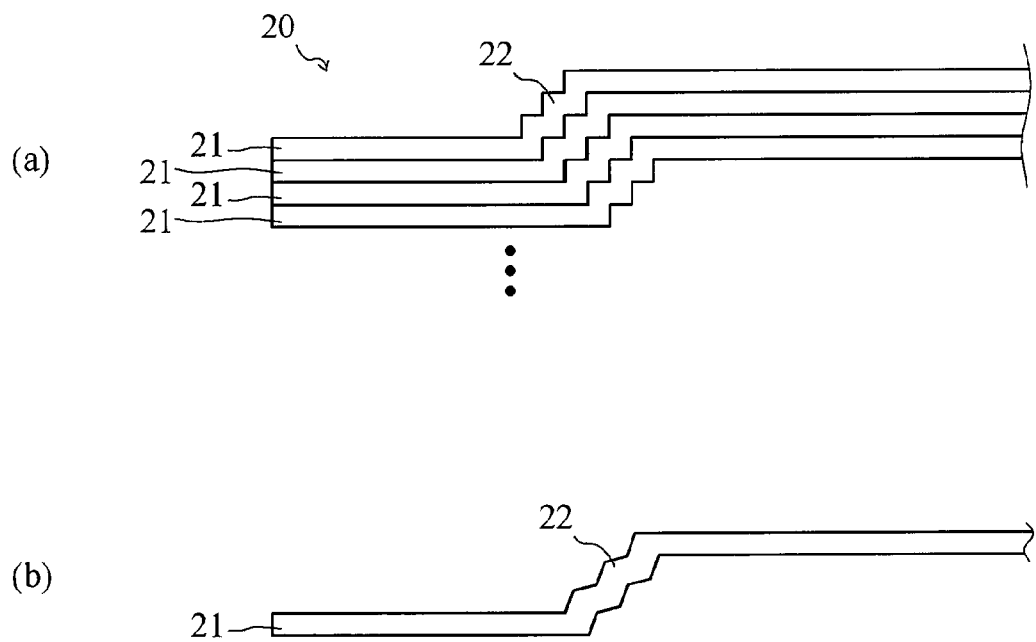
FIG. 6 illustrates the other embodiment of a pipe.

FIG. 6 shows the alternative embodiment of the pipe 20.

The pipe 20 as shown in FIG. 6 consists of laminated rectangle pipes 21. In other words, the pipe 20 is composed of the set of the rectangle pipes 21. Each rectangle pipe 21 has a short side in one direction (in detail, the gravity direction acting when the pipe is disposed in the cylinder head 1) and the rectangle pipes are laminated in the short side direction. The laminated rectangle pipes 21 are bonded each other, and they are inserted and jointed to the insert hole 31a. In this case, the insert hole 31a has a square shape.

The rectangle pipes 21 have step parts 22 that are formed by bending stepwise at both ends thereof, i.e., in the vicinity of the connecting area to the cylindrical cup 30. The step part 22 includes multiple steps which are formed along the longitudinal direction of the rectangle pipe 21. For example, the rectangle pipe 21 is turned even times along the longitudinal direction to form the step part 22.

The step parts 22 contained in the rectangle pipes 21 provide the spring property to the pipe 20. In other words, the step parts 22 are configured to incline to the flow direction of the EGR gas in the pipe 20.

Due to the spring property, the pipe 20 has high flexibility in the two directions perpendicular to the longitudinal direction of the pipe. The rectangle pipe 21 has high bending rigidity in the short side direction and the long side direction of the rectangle pipe, and the movement in this two direction can be allowed.

Hence, when the EGR gas passage 10 having the pipe 20 is fixed to the cylinder head 1, the misalignment of the fastening holes 3 is allowed.

As shown in FIG. 6(b), the step part 22 formed in the rectangle pipe 21 is preferably inclined gently from the center to the ends of the rectangle pipe 21. The inclination makes the condensed water caused by the EGR gas is smoothly discharged outside of the EGR gas passage 10.

As described above, in addition to the spring property given to the cylindrical cup 30, the pipe 20 may have a spring property. The spring property of the pipe improves the robustness against the misalignment of the fastening holes 3, thereby preventing the possible damage of the EGR gas passage 10 when fastening with the cylinder head 1.

Industrial Applicability

The present invention is preferably applicable to the cylinder head provided with the EGR gas passage in the water jacket.

Reference Signs List

1: cylinder head, 2: water jacket, 3: fastening hole, 10: EGR gas passage, 20: pipe (hollow pipe), 30: cylindrical cup (end member), 40: gas thread (fastening member)

The invention claimed is:

1. A cylinder head comprising an EGR gas passage in a water jacket,
   wherein the EGR gas passage comprises:
      a hollow pipe disposed in the water jacket and through which the EGR gas passes; and
      an end member formed with an insert hole into which the end of the hollow pipe is inserted and fixed,
   wherein the end member comprises:
      a bottom having the insert hole;
      a side wall formed continuously to the bottom; and
      a wedge portion projected outward from the outside of the side wall, and having an inclined surface facing the wall of the cylinder head and inclined to the flow direction of the EGR gas, and
   wherein the EGR gas passage is fixed to the cylinder head by holding the wedge portion of the end member between a fastening member for fastening the EGR gas passage to the cylinder head and the wall of the cylinder head.

2. The cylinder head according to claim 1,
   wherein the side wall comprises an inclined portion inclined to the flow direction of the EGR gas.

3. The cylinder head according to claim 2,
   wherein the inclined portion of the side wall is formed by turning the side wall sharply from the outer side to the inner side of the side wall.

4. The cylinder head according to claim 2,
   wherein the inclined portion of the side wall is inclined such that the outer diameter thereof becomes gradually large from the inner side to the outer side of the cylinder head.

5. The cylinder head according to claim 1,
   wherein the hollow pipe comprises an inclined portion inclined to the flow direction of the EGR gas.

6. The cylinder head according to claim 4,
   wherein the hollow pipe comprises an inclined portion inclined to the flow direction of the EGR gas.

* * * * *

UNITED STATES PATENT AND TRADEMARK OFFICE
CERTIFICATE OF CORRECTION

PATENT NO. : 8,936,012 B2
APPLICATION NO. : 13/147138
DATED : January 20, 2015
INVENTOR(S) : Masahiko Asano et al.

Page 1 of 1

It is certified that error appears in the above-identified patent and that said Letters Patent is hereby corrected as shown below:

On the Title page, item (56) under Other Publications:

change "International Search Report dated 2226 Oct. 2010" to -- International Search Report dated 26 Oct. 2010 --.

Signed and Sealed this
Twenty-ninth Day of September, 2015

Michelle K. Lee
*Director of the United States Patent and Trademark Office*